(12) United States Patent
Cysewski et al.

(10) Patent No.: US 10,076,734 B2
(45) Date of Patent: Sep. 18, 2018

(54) METHOD AND APPARATUS FOR CAPTURING MIXING BAR

(71) Applicant: Aerspun LTD, Kirkland, WA (US)

(72) Inventors: Seth Cysewski, Kirkland, WA (US); Nate Olmeim, Kirkland, WA (US)

( * ) Notice: Subject to any disclaimer, the term of this patent is extended or adjusted under 35 U.S.C. 154(b) by 0 days.

(21) Appl. No.: 14/120,172

(22) Filed: May 2, 2014

(65) Prior Publication Data
US 2015/0314253 A1 Nov. 5, 2015

(51) Int. Cl.
  *B01F 13/08* (2006.01)
  *B01F 3/04* (2006.01)
  *C12G 1/00* (2006.01)
  *C12H 1/16* (2006.01)

(52) U.S. Cl.
  CPC ...... *B01F 13/0818* (2013.01); *B01F 3/04439* (2013.01); *B01F 3/04531* (2013.01); *C12G 1/00* (2013.01); *C12H 1/16* (2013.01); *B01F 2215/0072* (2013.01)

(58) Field of Classification Search
  CPC .. B01F 13/08; B01F 13/0818; B01F 3/04439; B01F 3/04531; B01F 2215/0072; C12G 1/00; C12H 1/16
  See application file for complete search history.

(56) References Cited

U.S. PATENT DOCUMENTS

| | | |
|---|---|---|
| 2,350,534 A | 6/1944 | Rosinger |
| 2,951,689 A | 9/1960 | Asp et al. |
| 3,136,720 A | 6/1964 | Baermann |
| 3,854,704 A | 12/1974 | Bales |
| 4,145,383 A | 3/1979 | Randall |
| 4,162,129 A | 7/1979 | Bartholemew, Jr. |
| 4,494,452 A | 1/1985 | Barzso |
| 4,526,730 A | 7/1985 | Cochran et al. |
| 4,675,191 A | 6/1987 | Villettaz |
| 4,785,724 A | 11/1988 | Vassallo |
| 4,808,419 A | 2/1989 | Hsu |
| 5,075,234 A | 12/1991 | Tunac |
| 5,556,654 A | 9/1996 | Fregeau |
| 5,595,104 A | 1/1997 | Delaplaine |
| 5,713,263 A | 2/1998 | Burks, III |
| 6,082,204 A | 7/2000 | Munderloh |
| 6,325,433 B1 | 12/2001 | Nicholson et al. |
| 6,332,706 B1 * | 12/2001 | Hall ............... B01F 13/0818 261/83 |
| 6,988,825 B2 | 1/2006 | Coville et al. |
| 7,278,780 B2 | 10/2007 | Goodwin et al. |
| 7,300,580 B2 | 11/2007 | Lindsey et al. |
| 7,364,350 B2 | 8/2008 | Coville et al. |
| 8,104,620 B2 | 1/2012 | Lin et al. |
| 8,505,787 B2 | 8/2013 | Fox et al. |

(Continued)

Primary Examiner — Anshu Bhatia (57) ABSTRACT

The invention relates to a method and apparatus for capturing a stir bar in a container. A stir bar may be placed in a container and subjected to a changing magnetic field that causes the stir bar to rotate inside the container. A retaining band or sleeve having metallic or magnetic inserts or materials is placed around a portion of the container so that it is positioned near where the stir bar may be located or might slide past as the contents of the container are poured out of the container. Magnetic attraction between the retaining band or sleeve and the stir bar helps prevent the stir bar from inadvertently being poured out of the container.

7 Claims, 6 Drawing Sheets (56) References Cited

U.S. PATENT DOCUMENTS

| | | |
|---|---|---|
| 8,641,112 B1 | 2/2014 | Anderson |
| 2005/0006547 A1* | 1/2005 | Exler ................ A47G 23/0225 248/311.2 |
| 2006/0013926 A1 | 1/2006 | Lindsey et al. |
| 2006/0172041 A1 | 8/2006 | Farrell |
| 2007/0199199 A1 | 8/2007 | Lake et al. |
| 2009/0181144 A1 | 7/2009 | Farrell |
| 2013/0048827 A1 | 2/2013 | Meier et al. |
| 2013/0070555 A1 | 3/2013 | Akerstrom |

* cited by examiner

METHOD AND APPARATUS FOR CAPTURING MIXING BAR

FIELD OF INVENTION

The invention relates to a method and apparatus for use in capturing or retrieving a metallic or magnetic stir bar from a container by magnetically attracting the stir bar to a side of the container, thereby reducing the likelihood of the stir bar being inadvertently poured out of the container.

BACKGROUND OF THE INVENTION

The present invention relates to a method and apparatus for capturing or retrieving a metallic or magnetic stir bar from a container. The invention can be applied in a variety of different, non-limiting, settings such as in the aeration of wine, in conjunction with scientific lab equipment or in a manufacturing process where stir bars may be used.

One, non-limiting example where the invention can be used is in the aeration of wine. It has long been known that that allowing wine, particularly red wines, to "breathe" prior to consumption can improve the taste of the wine. Aeration processes generally involve allowing oxygen in the air to interact with the wine so that the flavor and aroma of the wine can open up. Processes and devices that can increase the rate at which oxygen interacts with the wine can reduce the time needed for the wine to breathe before drinking.

There are many different ways that wine can be aerated. One common way is to decant the wine by pouring out of a bottle and into a separate container where it can interact with the air for an extended period of time. The container may have a widened base so as to allow a greater surface area of wine to be exposed to the air. The length of time needed to sufficiently decant wine can vary significantly depending on several factors. Young red wines, for example, may need more aeration than older wines. Other factors that could impact the length of time needed for aeration may include the varietal types of grapes in the wine, storage conditions of the wine, wine temperature, additives in the wine, and even the style of wine making.

There has been a good deal of effort in the prior art to create a means to accelerate the aeration process. For instance, some devices attempt to accelerate the aeration process by bubbling air through the wine. Some examples of this are found in U.S. Pat. Nos. 4,494,452, 4,785,724, and 5,595,104, which all describe variations of extending a tube into an open bottle of wine and then pumping air through the tube. Other devices attempt to pour the wine over an object having a large surface area so that the wine has greater exposure to the surrounding air while it is being poured. Other devices attempt to agitate the wine in order to mix with wine with air.

U.S. Pat. No. 6,332,706, which is incorporated by reference in its entirety herein, describes using a stir bar to aerate wine. In particular, the '706 patent describes a process of pouring wine into a container, placing a container on top of a stir plate, placing a stir bar inside the container, and changing a magnetic field within the stir plate so as to cause the stir bar to rotate within the container. The rotating stir bar is capable of creating a vortex within the wine, thereby increasing the surface area of the wine in contact with the air while also providing a stirring effect within the wine itself that further contributes to aeration. Furthermore, the stir plate may have a variable speed to allow a user to adjust the rate of mixing of the wine, and the method may be used with a variety of wine decanters types.

While the use of a stir bar has advantages over other aeration methods, until the present invention one potential drawback of this aeration method was that it could be difficult to remove the stir bar from the container. Once the container is removed from the stir plate, the stir bar inside the container can move freely inside the container. As the container is rotated or shifted during use or movement, the unsecured stir bar is able to move freely around the bottom of the container in a potentially distracting manner. Moreover, as wine is poured out of the container the unsecured stir bar has a high likelihood of falling out of the container. One prior attempt to address these potential drawbacks has been to configure a stir bar such that it cannot escape the container. While this configuration may prevent the stir bar from inadvertently falling out of the container, it also introduces several disadvantages such as not allowing the stir bar to be used in different container shapes as well as presenting difficulties in cleaning the decanter and stir bar.

While the use of a stir plate and stir bar can be very effective for aerating wine, the use of these devices is perhaps better known in the scientific community for use in a laboratory or scientific research environments. Interestingly, even though the use of a stir bar is well-established in the scientific community, the methods and apparatuses used to remove the stir bar from the container in this setting are inconvenient and have drawbacks.

In general, commercially available devices that aid in the removal of a stir bar in a lab setting are either of two types. The first type is a metal rod that is placed into the mixture in the container near enough to the stir bar to cause magnetic forces to securely connect it with the rod. As the rod is lifted out of the container, the magnetic attraction between the rod and the stir bar causes the stir bar to be lifted out of the container. One disadvantage of the use of a rod is that it involves introducing the rod into the mixed fluid in the container. As a result, additional steps are required to ensure that the equipment is clean and does not interact with the fluid or other mixed material in the container. Furthermore, if the neck of the container is significantly narrower than the base of the container, such as with an Erlenmeyer flask, a conical flask or some wine decanters, it may be difficult to position the rod closely enough to the stir bar to create magnetic attraction between them. Thus, the use of a rod to remove a stir bar has certain limitations and disadvantages.

The second type of device used in a lab setting to remove stir bars from containers is a magnetic hand-held device that a user places on the outside surface of the container. The magnetic attraction between the hand-held device and the stir bar causes the stir bar to be drawn against the inside wall of the container near where the hand-held device is positioned. Once the stir bar is drawn to the hand-held device, the user must then manually manipulate the device up the outer wall of the container until reaching the opening at the top. One disadvantage of this hand-held device as a method of retrieving a stir bar is that the user must continuously maintain the hand-held device against the outer wall of the container without moving it away from the outer surface of the container in order to maintain sufficient magnetic attraction between the stir bar and the hand-held device. This can be challenging if the profile of the outer wall of the container is curved or angled, such as with most wine decanters and also with some lab equipment such as Erlenmeyer flasks, volumetric flasks, or the like. An additional disadvantage of this device is that it can be awkward recovering the stir bar from inside the container because one hand may be needed to manipulate or control the device while the other hand is needed to hold the container so that the hand-held device remains in contact with the exterior wall of the container. As a result, it can be challenging to have a free hand available to retrieve the stir bar when using a hand-held device to retrieve a stir bar.

Because currently available methods and devices have disadvantages, it is desirable to have an improved method and device for collecting a stir bar from a container, for securely holding it at a location in the container, or for reducing the likelihood of it being inadvertently poured out of the container. More particularly, when a stir bar is used to aerate wine or other beverages it is desirable to have a method and apparatus for retrieving the stir bar or otherwise securely holding it at a location in the container so that the likelihood of the stir bar being a distraction or being inadvertently poured out of the container is reduced.

SUMMARY OF THE INVENTION

The present invention overcomes the disadvantages of the prior art by proving a method and apparatus for aerating wine for drinking, comprising the steps of pouring the wine into a container, placing said container on top of a stir plate, placing a stir bar inside said container, changing a magnetic field within said stir plate so as to cause said stir bar to rotate within said container thereby establishing a vortex in the wine, said vortex having a surface area in contact with air, controlling the rate of rotation of the stir bar and thereby the surface area of said vortex so as to aerate the wine for consumption, and placing a stir bar retaining band at least partially around a portion of the container, wherein the retaining band is configured to magnetically attract the stir bar.

In one embodiment of the invention, the container has an opening through which liquid may be poured and wherein said stir bar retaining band is disposed near said opening. The stir bar retaining band may be placed on the neck of the container or placed near the opening so that as the contents of the container are poured out the retaining band magnetically attracts the stir bar to a portion of the interior wall of the container if the stir bar moves toward or through a portion of the container where the retaining band is located. Alternative embodiments may include the stir bar retaining band forming a sleeve that surrounds at least a portion of the container. The sleeve may be disposed near the base of the container and may further be configured to aid in providing a more secure gripping surface when pouring contents out of the container. For instance, the sleeve may have a textured pattern on its outer surface to help ensure a more secure grip. Alternatively, the sleeve may be formed of a foamed, elastic or otherwise deformable material to help ensure a more secure grip when grasped by a user. Additionally, the sleeve may have a handled formed therein to further assist in pouring contents out of the container. The use of a handle may also allow the sleeve to be configured with one or more metallic or magnetic inserts in or on the sleeve at an opposing side of the sleeve as where the handle is located so that the stir bar likely will be located near the insert during pouring.

Furthermore, the material and configuration of the sleeve may be selected to provide insulating properties to help maintain the fluid in the container at or near a desired temperature. In yet another embodiment, the stir bar retaining band or sleeve covers at least a portion of the base of the container. In yet another embodiment, a magnetic or metallic patch may be placed on a portion of the container, such as on the base of the container or on a side wall of the container. The patch may optionally be held in place with the use of an adhesive. Metallic and/or magnetic material may be disposed in the base so as to cause sufficient magnetic attraction with the stir bar either to restrict its movement or to prevent it from being inadvertently being poured out of the container.

In one embodiment, the container is a glass decanter suitable for aerating wines. In an alternate embodiment, however, the container may be a flask or other type of container suitable for use in a scientific lab. The stir bar retaining band may be selectively removable from the containing. This allows the stir bar retaining band or sleeve to be attached to the container only when desired. During mixing of container contents, for example, it might be desirable to remove the stir bar retaining band or sleeve to prevent its magnetic attraction from interfering with the rotation of the stir bar by a stir plate.

In yet another embodiment, the container may be configured such that a metallic or magnetic band, sleeve, or insert is permanently disposed in a portion of the container. For instance, one or more metallic or magnetic bands, sleeves, or inserts may be integrally formed in a wall of the container. Preferably, the location of an integrally formed band, sleeve, or insert is sufficiently positioned away from the base of the container so as to not interfere with the desired rotation of the stir bar when operating a stir plate. In one embodiment, an integrally formed band, sleeve, or insert may be disposed near an opening of the container, such as in a neck of the container or a spout, so that the band, sleeve, or insert is more likely to be in position to cause magnetic attraction with the stir bar during pouring. The integrally formed band, sleeve, or insert may be disposed on an outer surface of the container or on an inner surface of the container. Alternatively, the integrally formed band, sleeve, or insert may be disposed within the wall of the container.

Other embodiments of the invention relate to an apparatus for aerating wine. One such embodiment comprises a wine container, such as a decanter, a stir bar configured to be selectively placed inside the container, a stir plate that is capable of rotating the stir bar, and a stir bar retaining band or sleeve disposed on a surface of the container. As previously indicated, in one embodiment the retaining band or sleeve may be configured to allow it to be selectively positioned on a portion of the container or removed from the container. The stir bar retaining band is capable of exerting magnetic attraction to the stir bar. In one embodiment, this magnetic attraction can be achieved by configuring the band or sleeve so that it has magnetic material disposed in it. For instance, one or more magnets may be disposed in or on the band or sleeve. In one embodiment, a plurality of magnets may be disposed in or on the band or sleeve such that they are relatively evenly distributed around the outer wall of the container. In another embodiment, one or a plurality of magnets may be configured in or on the band or sleeve such that they are disposed near a portion of the container wall where the stir bar may slide by if the container is shifted or rotated, such during pouring of fluid from the container.

In yet another embodiment, the band or sleeve may have metallic material disposed in or on the sleeve. The metallic material in the band or sleeve is in sufficient quantity to cause magnetic attraction of the stir bar to the metal. In this embodiment, the magnetic properties of the stir bar case the stir bar to move toward a portion of the interior wall of the container near where the metal in the band or sleeve is disposed. As mentioned previously, the stir bar retaining band can be placed on the neck or opening of the container, on a surface near the base of the container or at least partially covering the base of the container. As mentioned previously, a patch with at least a portion comprising magnetic or metallic material may be used in any of the embodiments described herein.

In yet another embodiment, the stir bar retaining band, sleeve, insert, or patch may be configured to receive customizable artwork or branding. For instance, a wine maker, lab equipment manufacturer, research facility, restaurant owner, advertiser, or the like can customize the stir bar retaining band with a company logo or other artwork if desired. The ability to provide customizable artwork or branding may allow users to more easily determine the type or degree of aeration or desired mixing parameters.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

The above mentioned features and objects of the present invention will be discussed in terms of the attached figures wherein like reference numerals denote like elements and in which.

DETAILED DESCRIPTION OF PREFERRED EMBODIMENTS OF THE INVENTION

Figure 1:
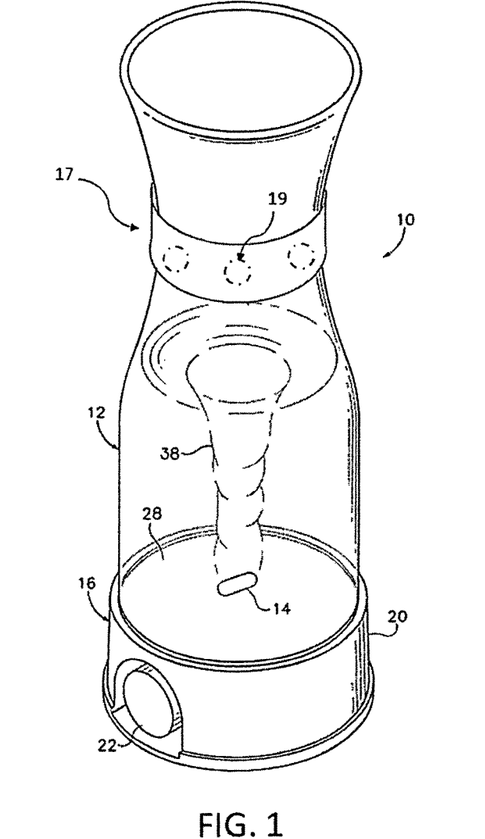
FIG. 1 is a perspective view of a container, stir bar, stir plate and stir bar retaining band of the present invention.

Referring now to the figures, FIG. 1 shows a mixing or aeration system 10 comprising a container 12, stir bar 14 and stir plate 16. The container is capable of holding fluid 18 that may be mixed during operation of the stir plate 16. Disposed on an outer surface near the opening of the container 12 is a stir bar retaining band 17. As shown in FIG. 1, a portion of the neck of the container 12 may be narrower than other portions of the neck or the base of the container 12. For containers having such a configuration, it may be desirable to position the stir bar retaining band 17 around the narrower portion of the neck or container opening. This position may allow the shape of the neck of the container 12 to assist in keeping the stir bar retaining band 17 in position as the widening portions of the neck of the container 12 above and below the position of the stir bar retaining band 17 would reduce the likelihood of the band 17 inadvertently separating from the container 12.

As an alternative to disposing a retaining band 17 on an outer surface of container 12, one or more metallic or magnetic bands, sleeve, or inserts may be integrally formed with the container 12. For instance, the container 12 may be formed with a portion of its wall being made at least partially with magnetic or metallic material in sufficient quantity to cause the stir bar 14 to be magnetically attracted to it. The metallic or magnetic band, sleeve, or insert that may be integrally formed in a portion of the container may be disposed on an outer surface of the container, an inner surface of the container, or disposed within the container wall.

As mentioned previously, the stir bar retaining band is configured to magnetically attract the stir bar 14. This magnetic attraction can be achieved by providing one or more magnets in the retaining band or sleeve and/or by disposing one or more of them on an outer surface of the retaining band or sleeve. As shown in FIG. 1, a plurality of magnets may be disposed in or on a surface of the retaining band or sleeve 17 such that they are relatively evenly distributed around the wall of the container. One advantage of distributing a plurality of magnets around the container in this manner is that the fluid in the container may be poured out in any particular direction or orientation of the container and the retaining band 17 will still have a high likelihood of magnetically attracting the stir bar to help prevent it from inadvertently being poured out of the container 12.

Alternatively, one or more magnets may be concentrated near a portion of the container wall where the stir bar is expected to slide or pass by during pouring. For instance, if the container has a handle, lip or spout to facilitate pouring, then one or more magnets in or on the retaining band 17 may be configured so that they are concentrated near the portion of the container wall, lip, or spout where the stir bar might be located or pass by during pouring.

Another embodiment of the invention may dispose magnetic material throughout the retaining band 17. Thus, rather than incorporating one or more magnets in or on a surface of the retaining band 17, the retaining band may be substantially formed of magnetic material to draw the stir bar towards an interior surface of the container 12.

It is contemplated that the stir bar 14 itself will be magnetic in order for the stir bar to be able to rotate when the stir plate 16 is in operation. As a result, it may also be possible that the magnetic properties of the stir bar 14 are sufficient to draw it towards an interior surface of the container 12 near where the retaining band is located even if the retaining band 17 has metallic material disposed within it or on its surface instead of magnetic materials. For example, referring again to FIG. 1, the magnets illustrated in FIG. 1 may instead be metallic inserts either in or on a surface of the retaining band 17. As the stir bar nears one or more of the of the metallic inserts, the magnetic properties of the stir bar may draw it towards the inner wall of the container near where the metal inserts are disposed on the outside of the container. As a result, the magnetic attraction of the stir bar retaining band draws the stir bar 14 towards a portion of the inner wall of the container that is near the position of the band 17. Once the stir bar 14 is within sufficient range for the band's magnetic attraction to move the stir bar closer towards it, the magnetic attraction can then help prevent the stir bar from inadvertently falling out of or being poured out of the container 12. Likewise, if one or more bands, sleeves, or inserts are integrally formed in or on a container wall, the stir bar 14 may be similarly attracted toward the container wall.

Furthermore, a metal insert in the band may be an elongated strip of metal that extends at least partially around the outer wall of the container. The metal strip may be further configured so that it is expanded radially outwards while being attached to the container due to the container wall having a larger cross-sectional profile than the profile of the band when not attached to a container. As the metal strip is expanded during attachment, it may then apply inward-facing gripping forces on opposing portions of the outer container wall, thereby assisting in the retaining band remaining in a desired location on the container. Additionally, metallic particles may be dispersed throughout a retaining band such that the magnetic properties of the stir bar draw the stir bar towards the band.

One alternative embodiment may involve disposing the retaining band on the inside wall of the container. In this alternative embodiment, the sleeve, band or insert may be configured to have a larger profile than the cross-sectional profile of the inside wall of the container. As the band is placed in position, it may be compressed so that when attached it applies an outward force against the interior of the container wall, thereby assisting in holding the band in its desired position.

The magnetic attraction of the stir bar retaining band 17 can be accomplished in a variety of ways. In one embodiment, the stir bar retaining band 17 comprises at least one magnet 19. The magnet 19 may be disposed inside the band 17, or may be at least partially disposed on an outer surface of the band. Moreover, positioning one or more magnets in the band so that the magnet is in close proximity to or in contact with the container wall may allow the magnetic attraction with the stir bar to be more likely able to hold the stir bar against the inner wall of the container near the retaining band. Distributing a plurality of magnets in the stir bar retaining band 17 may be desired if the container does not require pouring have a particular orientation. In one embodiment, magnetic material is provided in the stir bar retaining band in increments of 90° or less, while in an alternate embodiment magnetic material is disposed in the band in increments of 60° or less. In yet another embodiment, the stir bar retaining band has continuous portion of magnetic material.

In one embodiment, the stir bar retaining band 17 may be selectively removed or attached to a container. The ability to remove and attach the stir bar retaining band provides several advantages, including the ability to use the band 17 with multiple containers as well as allow the band 17 to be removed during placement of the container on a stir plate in order to avoid potential interference of stir bar rotation by the stir plate.

Moreover, the ability to remove and attach the retaining band 17 also allows the band to be cleaned in between uses. Allowing selective attachment and removal of the retaining band 17 also allows it to be used with multiple containers. For instance, a selectively removable retaining band may be used with a first container until the stir bar is retrieved from the container or until the fluid in the container has been emptied. Once the stir bar has been retrieved, the band may be removed from the container at any time, thereby allowing the band may to be cleaned or reused with a second container. While the first container may continue to be used to dispense fluid until it is fully emptied, and thereafter may require cleaning before reuse, once the stir bar is retrieved from the container the retaining band may be removed in advance of completed use of the first container and be applied to a second container.

Container 12 may be any flat bottomed container suitable for containing wine or capable of use with a stir bar, such as a bottle, carafe, decanter, beaker, or flask. Wine bottles having punts are disfavored, since the punt interferes with rotation of the stir bar as discussed below. Otherwise, any shape or size of container may be employed that fits on the stir plate 16. The containers shown in FIGS. 1-14 are transparent, but the invention finds utility with opaque containers as well as containers made of glass, plastic, or other materials suitable for use with a stir bar and stir plate.

Figure 2:
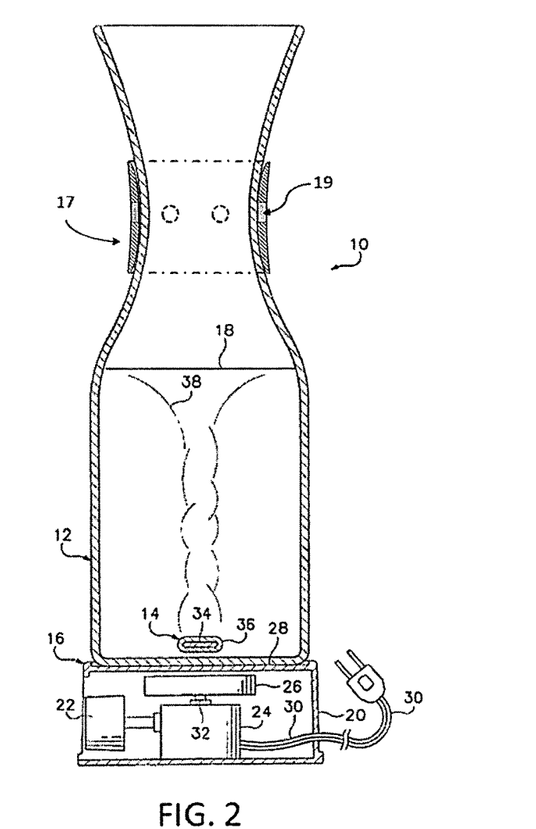
FIG. 2 is a cross section of the embodiment of FIG. 1.
Figure 3:
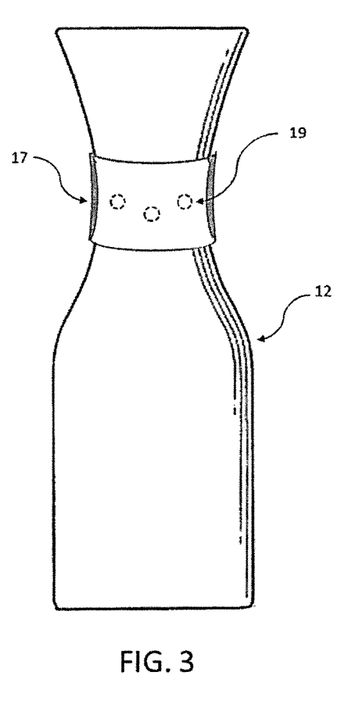
FIG. 3 is a front view of one embodiment of a container and stir bar retaining band of the present invention.
Figure 4:
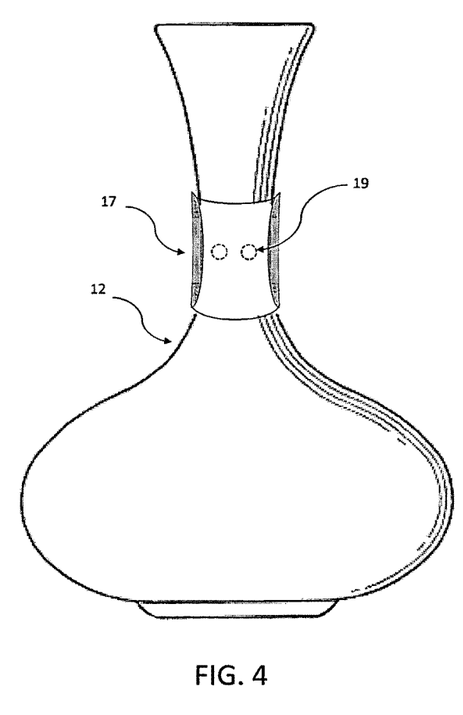
FIG. 4 is a front view of another embodiment of a container and stir bar retaining band of the present invention.

Referring now especially to FIG. 2, the illustrated stir plate 16 is itself is comprised of a housing 20 having a knob 22, an electric motor 24, and a rotatable arm 26. It should be noted that the features of the stir plate illustrated in the figures are not intended to be limiting on the scope of the invention. Other types of stir plates having different features or capabilities may likewise be used with the present invention. For instance, the illustrated stir plate 16 in FIG. 2 has a knob that can be used to adjust the rate of rotation of the stir bar, and consequently may be used to vary the vortex formed in the fluid in the container during use. Alternatively, the present invention could be used with a stir plate that uses firmware to electronically adjust the rotational speed of the stir bar instead of a knob. Returning to FIG. 2, the stir bar 14 and rotatable arm 26 are magnetically attracted to each other. The top 28 of the housing 20 is substantially flat to support the container. In addition, the housing 20 is made of a non-ferrous material such as plastic so as to allow magnetic interaction between the stir bar and rotatable arm 26. The housing is sized to be large enough to accommodate a wide variety of bottles and carafes. The knob 22 is connected to a variable speed electric motor 24, although as previously indicated other stir plates may capable of varying the speed of rotation in different ways. A power cord 30 provides power to the motor 24, but alternatively a battery could be used. The rotatable arm 26 is connected to the electric motor 24 by a drive shaft 32. Preferably the arm 26 is magnetic. The motor 24 causes rotation of the arm 26 beneath the surface of the top 28 of the housing 20. The motor is preferably a variable speed motor, so that rotation of the knob 22 causes the electric motor to increase or decrease the rate of rotation of the arm 26. The stir plate 16 may be a model HI 180 stirrer from Hanna Instruments of Woonsocket, R.I.

The stir bar 14 is preferably comprised of a central core 34 surrounded by a coating 36. The central core 34 is preferably a magnet. The coating surrounding the central core 34 is preferably a material that resists accumulation of contaminants and is easily cleaned, such as a synthetic resinous fluorine-containing polymer sold under the trademark TEFLON®. The nature of the stir bar reduces the risk of contamination of the wine. The stir bar is relatively small and has a small surface area, thus minimizing the amount of foreign surface area in contact with the wine. In addition, the coating minimizes the risk of contamination of the wine by providing a coating that resists contaminants and is easy to clean. Stir bars may be obtained from Hanna Instruments.

In addition, a stir bar retaining band 17 at least partially surrounds the opening of the container 12. In the cross-sectional view of FIG. 2, the band 17 comprises multiple magnets and/or metal inserts disposed around the band. As the mixed contents are poured out of the container, it is possible that the stir bar may begin to move inside the container. Depending on the degree of the rotation of the container during pouring, the stir bar may have a tendency to slide out of the container inadvertently. The magnetic attraction of the stir bar to the retaining band helps draw the stir bar towards a wall of the container, either due to the combined magnetic attraction between one or more retaining band magnets and the stir bar or as a result of the magnetic properties of the stir bar attracting it towards one or more metallic inserts, metallic strips, or metallic material in the retaining band. Preferably, the magnetic attraction is sufficient to help prevent the stir bar from inadvertently escaping the container.

Figure 7:
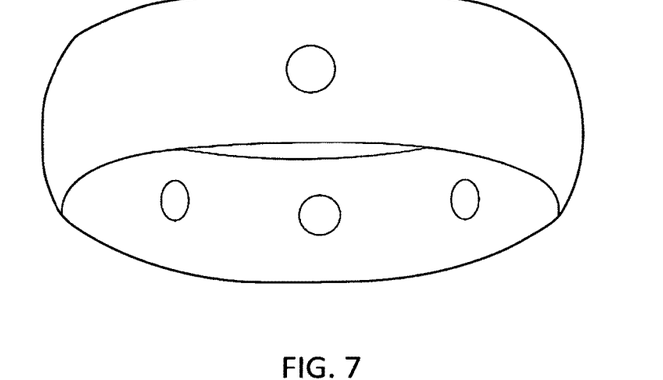
FIGS. 7 and 8 are illustrations of embodiments of a stir bar retaining band of the present invention.
Figure 8:
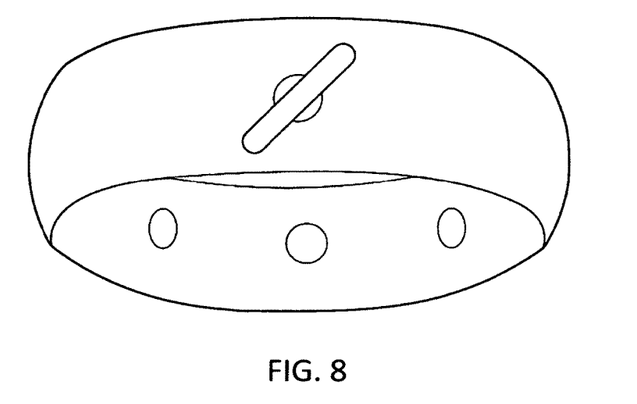

The stir bar retaining band may be attached or otherwise connected to a container. For example, the band may utilize a hook and loop system to hold the band 17 in a desired position. Alternatively, the band 17 may only partially surround a portion of the container. FIGS. 7-10 further illustrate particular features of some embodiments of the retaining band. FIGS. 7 and 8, for instance, illustrate a retaining band 17 with a plurality of magnets or metallic inserts 19 disposed in the retaining band so that one or more of them are likely to contact the outside of the container when the retaining band is attached to it. As shown in FIG. 10, in some embodiments the retaining band 17 may be an elongated strip of material in which the magnets or metallic inserts are placed. When assembled around a container, one end of the elongated strip may extend over an opposing end of the elongate strip to as to wrap completely around portion of a container wall. The ends of the elongated strip may be connected to each other with a fastener. As illustrated in FIGS. 7 and 8, the overlapping ends of the elongated strip may be configured to have one or more magnets on a first end of the elongated strip that may be aligned with a second set of one or more magnets, or optionally one or more metallic inserts, on a second end of the elongated strip. As this alignment occurs, the ends can be held together by magnetic attraction between the two ends. Alternatively, an adhesive may be used to facilitate holding a band, sleeve, or insert in a desired position. As shown in FIG. 8, the stir bar 14 may be placed near the metallic or magnetic material of the retaining band 17 so that it can be selectively be associated with the retaining band 17 during storage when not in use to aerate fluid in a container.

In yet another embodiment, the ends of the elongated strip may be configured so that they abut each other instead of overlapping when the retaining band 17 is placed on a container 12. The opposing ends may be configured with a latching mechanism or other fastener to help hold the retaining band around the container. Alternatively, the ends of the elongated strip may be held together using magnetic attraction. For instance, one or more magnets may be disposed on or near one end of the elongated strip and one or more magnets or one or more metallic inserts may be disposed on or near on the opposing end of the elongated strip. As the two ends are positioned near each other, the abutting ends may be drawn together by magnetic attraction.

Figure 9:
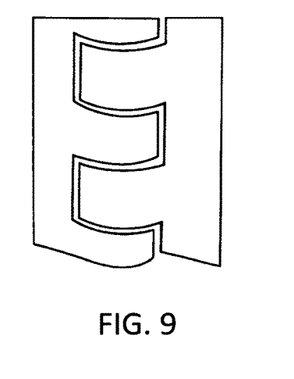
FIG. 9 is an illustration of one aspect of an embodiment of the invention where a hinge may be formed in a retaining band or sleeve to facilitate its installation or removal from a container.
Figure 10:
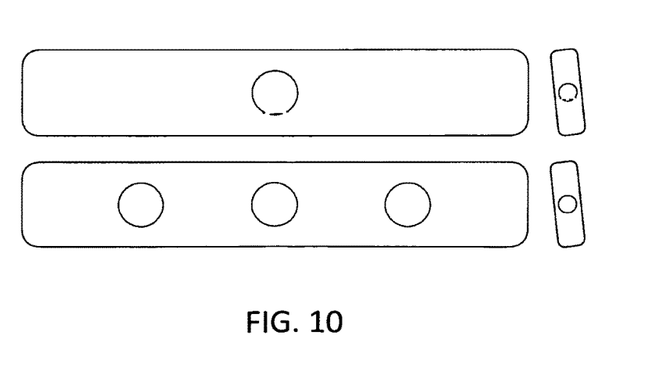
FIG. 10 is an illustration of alternative embodiments of the invention where the retaining band or sleeve is a strip that can be wrapped around a portion of a container.
Figure 11:
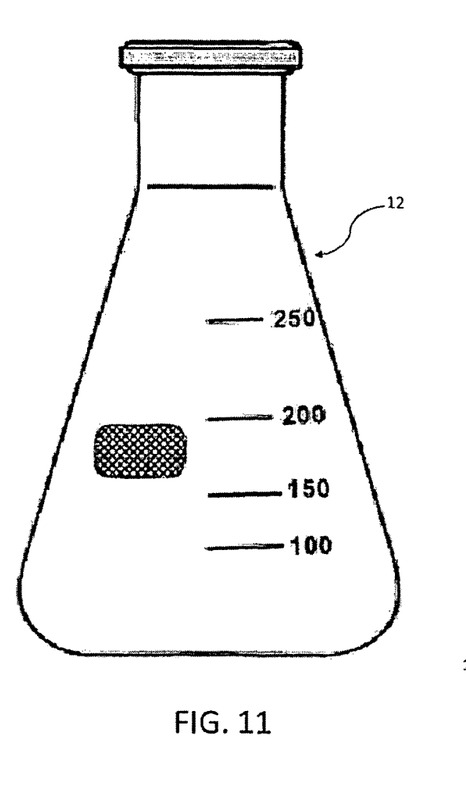
FIGS. 11-14 are further illustrations of alternative aspects of the invention exemplified in use with scientific lab equipment.

Referring now to FIG. 9, a hinge may also be disposed on the retaining band. Although a hinge is not required in every embodiment of the invention, it may be used in some embodiments to allow the retaining band to be opened or closed so that it may be more easily installed on or removed from a container. If the retaining band is formed of metallic material, for instance, the band may not be flexible enough to slip on or off of a container without the assistance of a hinge. Thus, during installation of the retaining band 17, a hinge may be used to create an opening in the band that is sufficiently wide enough to allow the band to be positioned around the container 12 in a desired location. Once the retaining band is in a desired position, the hinge may be closed so that the band is substantially in contact with the container. A fastener, latching mechanism, magnetic properties, or adhesive may be used to hold the hinge of the retaining band in a closed position. Alternatively, a spring may be used with the hinge to apply forces to the hinge that urge it to a closed position absent a countervailing force causing the hinge to open.

Figure 5:
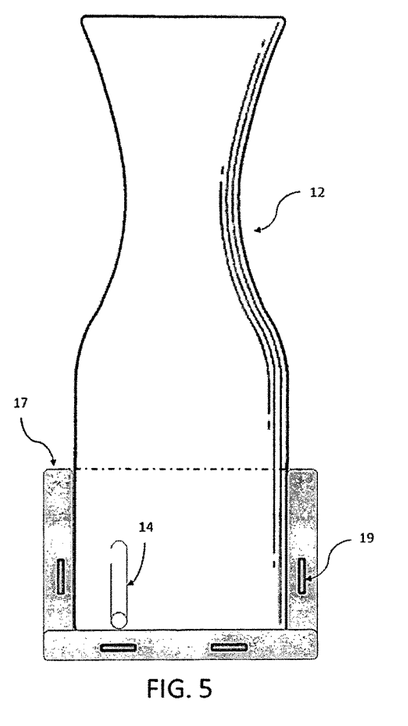
FIG. 5 is a front view of another embodiment of a container and stir bar retaining base of the present invention.
Figure 6:
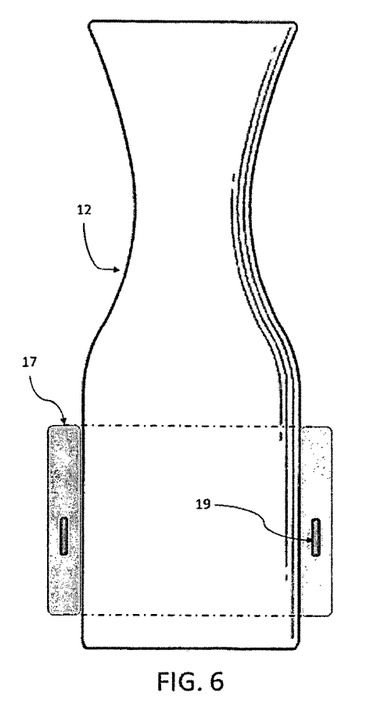
FIG. 6 is a front view of another embodiment of a container and a stir bar retaining sleeve of the present invention.
Figure 12:
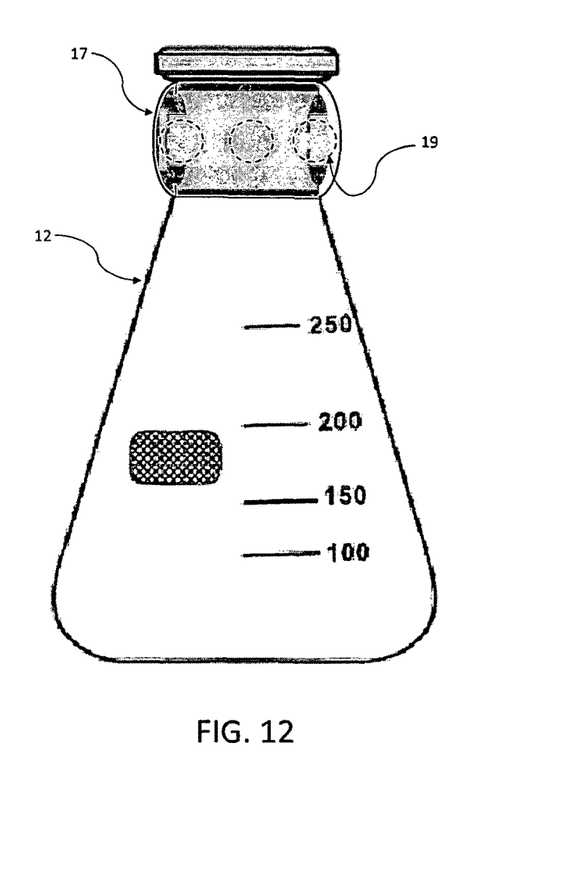
Figures 13, 14:
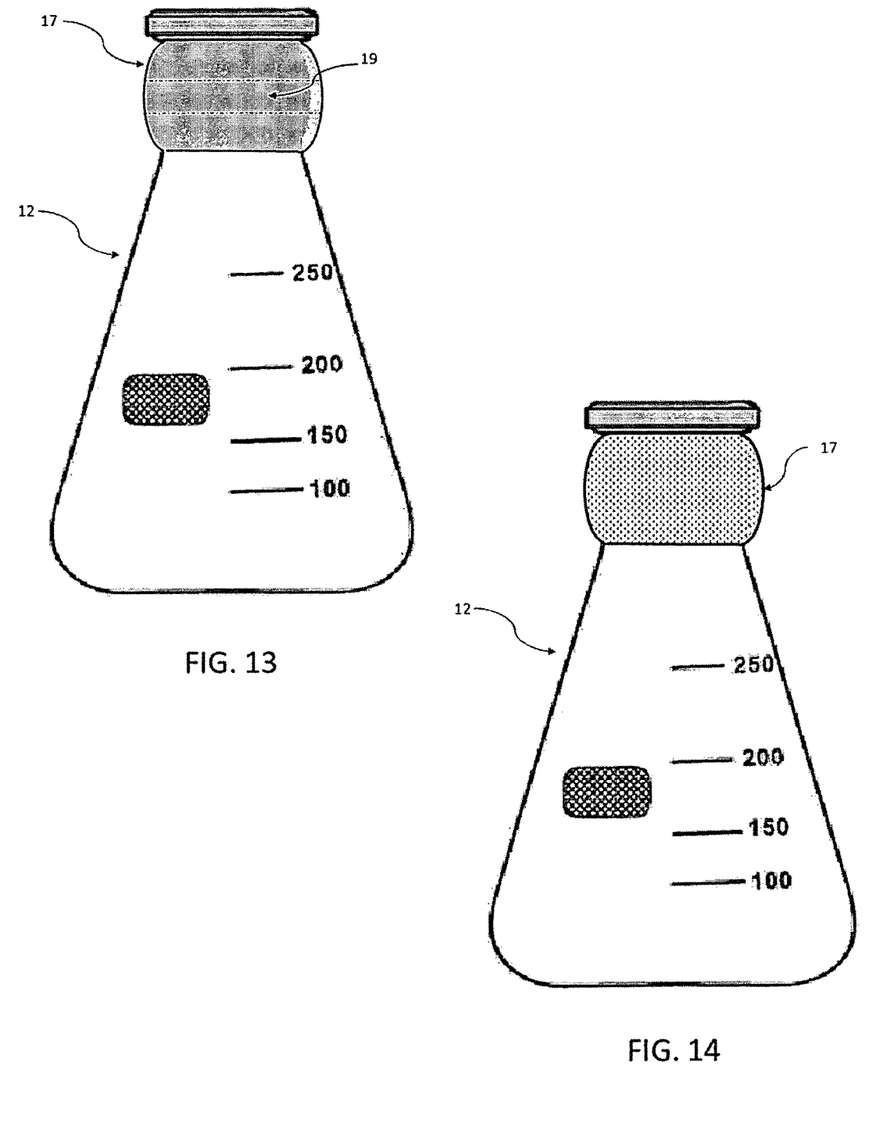

FIGS. 11-14 provide several illustrations of how the present invention may, be used with lab equipment. The various features and embodiments described herein can be used in this context to provide a more convenient solution for researchers and scientific labs. As discussed above, prior devices and methods can require introducing an additional object into the mixed fluid or may require some manual dexterity. In contrast, FIGS. 11-14 show how the retaining band of the present invention can be conveniently applied to a container to capture a stir bar. In particular, FIG. 12 illustrates a retaining band with a plurality of magnets or metallic inserts disposed in the band. As shown in FIGS. 7 and 8, however, the magnets or metallic inserts may be disposed so that they are at least partially exposed on a surface of the retaining band. FIG. 13 illustrates the use of a metallic or magnetic strip similarly disposed in or on a surface of the retaining band. Lastly, FIG. 14 illustrates that the retaining band may be formed at partially of metallic or magnetic particles dispersed throughout the retaining band. Any other features or alternative embodiments to the present invention described herein may also be used with lab equipment. For instance, the use of a retaining sleeve as illustrated in FIGS. 5 and 6 may also be used with lab equipment. Likewise, one or more bands, sleeves, or inserts of metallic or magnetic material may be integrally formed in a portion of the container through which contents may pass during pouring. Although not shown in FIGS. 11-14, the retaining band or sleeve also may be formed of metallic material and utilize a hinge as shown in FIG. 9 or other alternative means for opening and closing the retaining band or sleeve around the container.

In operation to aerate wine, the stir bar 14 rotates within the housing 12 to cause the wine to be aerated. The stir bar 14 rotates due to a magnetic interaction between the stir bar 14 and the rotating arm 26. In the preferred embodiment, both the stir arm 14 and rotating arm 26 are magnets. However, only one of the stir arm 14 and arm 26 need be a magnet, so long as the other contains enough ferrous material to provide a sufficient magnetic attraction. In addition, while a rotating arm 26 has been described, other mechanisms may be used to provide a changing magnetic field within the stir plate 16 so as to cause the stir bar 14 to rotate. For example, the electric motor 24 could be replaced by a series of wire coils and one or more transformers which would cause electric current to be supplied to the coils in a manner to cause the stir arm 14 to rotate.

The device 10 thus may be used as follows. Wine 18 is poured into the container 12. The container 12 is placed on top of the housing 20. The knob 22 is turned to cause the electric motor 24 to rotate the rotating arm 26. In other embodiments, the stir plate may have firmware or other ways to provide variable speed of rotation. The magnetic attraction between the rotating arm 26 and stir bar 14 causes the stir bar 14 to rotate, which then begins stirring the wine 18. The degree of spinning of the stir bar 14 can be controlled by the knob 22, by firmware or by other ways to provide variable speed of rotation. The speed of rotation of the stir bar 14 is selected to cause a vortex 38 to appear in the wine. The vortex substantially increases the surface area of the wine in contact with the air. The size of the vortex can be controlled by controlling the rate of rotation of the stir bar 14. By controlling the size of the vortex, the amount of surface area in contact with the air can be controlled, and thus the rate of aeration may be increased or decreased. Since the surface area of the vortex can be substantially greater than the surface area of the undisturbed wine, the rate of aeration relative to undisturbed wine may be substantially increased. For example, 750 mL of wine may be aerated using the method of the present invention in only 30 minutes, while undisturbed the same volume may require four to eight hours.

The present invention may be used with a wide variety of ornamental designs and features. Some such ornamental design is shown in FIGS. 3-14 which features a transparent glass decanter. The ornamental features of this design are comprised of the transparent container, the relative size and shape of the container, the relative size and shape of the stir plate, and the location of the knob.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A wine aerating apparatus, comprising:
   (a) a container configured to receive wine for aeration;
   (b) a stir bar configured to be disposed in the container;
   (c) a stir plate capable of changing a magnetic field so as to cause said stir bar to rotate within said container, and
   (d) a stir bar retaining band disposed a surface of the container, wherein the stir bar retraining band is configured to magnetically attract the stir bar;
   (e) the stir bar retaining band disposed on a surface of the container, wherein the stir bar retaining band is configured to evenly distribute the magnetic field around the entire circumference of the band to magnetically attract said stir bar.

2. The apparatus of claim 1, wherein the stir bar retaining band is a sleeve that partially surrounds the container.

3. The apparatus of claim 1, wherein the stir bar retaining band at least partially covers a base surface of the outside of the container.

4. The apparatus of claim 1, wherein the stir bar retaining band is disposed on an outer surface of the container.

5. The apparatus of claim 1, wherein the stir bar retaining band is configured to receive customizable artwork or branding.

6. The apparatus of claim 1, wherein the stir bar retaining base is disposed on the base of the container;
   (a) a magnet is disposed on the base of the container so as to cause said stir bar to be attracted to the base of the container;
   (b) wherein the magnetic base contains a suspended moveable magnet that serves as a point of contact between said stir bar and the stir plate.

7. The apparatus of claim 1, wherein the stir bar retaining magnet is an integrated part of the base of the container;
   (a) a magnet is integrated into the base of the container so as to cause said stir bar to be attracted to the base of the container;
   (b) wherein the base contains an integrated suspended moveable magnet that serves as a point of contact between said stir bar in the vessel and the stir plate.

* * * * *